(12) United States Patent
Hennige et al.

(10) Patent No.: US 7,709,140 B2
(45) Date of Patent: May 4, 2010

(54) SEPARATOR PROVIDED WITH ASYMMETRICAL PORE STRUCTURES FOR AN ELECTROCHEMICAL CELL

(75) Inventors: Volker Hennige, Duelmen (DE); Christian Hying, Rhede (DE); Gerhard Hoerpel, Nottuln (DE); Petr Novak, Brugg AG (CH); Jens Vetter, Wurenlingen (CH)

(73) Assignee: Evonik Degussa GmbH, Essen (DE)

( * ) Notice: Subject to any disclaimer, the term of this patent is extended or adjusted under 35 U.S.C. 154(b) by 1312 days.

(21) Appl. No.: 10/536,270

(22) PCT Filed: Nov. 6, 2003

(86) PCT No.: PCT/EP03/12384

§ 371 (c)(1),
(2), (4) Date: May 25, 2005

(87) PCT Pub. No.: WO2004/049471

PCT Pub. Date: Jun. 10, 2004

(65) Prior Publication Data

US 2006/0078791 A1    Apr. 13, 2006

(30) Foreign Application Priority Data

Nov. 26, 2002  (DE) ............................... 102 55 121

(51) Int. Cl.
*H01M 2/14* (2006.01)
*H01M 2/16* (2006.01)

(52) U.S. Cl. ................. 429/145; 429/129; 429/251; 427/202; 427/203; 427/204; 427/205

(58) Field of Classification Search ................. 429/129
See application file for complete search history.

(56) References Cited

U.S. PATENT DOCUMENTS

| 6,001,509 | A  | * | 12/1999 | Kim et al. | ............ | 429/309 |
| 6,296,969 | B1 | * | 10/2001 | Yano et al. | ............ | 429/145 |
| 6,299,668 | B1 |   | 10/2001 | Penth et al. | | |

(Continued)

FOREIGN PATENT DOCUMENTS

| DE | 198 38 800 | 3/2000 |
| DE | 199 12 644 | 9/2000 |

OTHER PUBLICATIONS

U.S. Appl. No. 12/063,626, filed Feb. 12, 2008, Hying, et al.
U.S. Appl. No. 11/917,914, filed Dec. 18, 2007, Holzapfel, et al.
U.S. Appl. No. 12/388,671, filed Feb. 19, 2009, Hennige, et al.

*Primary Examiner*—Dah-Wei D Yuan
*Assistant Examiner*—Katherine Turner
(74) *Attorney, Agent, or Firm*—Oblon, Spivak, McClelland, Maier & Neustadt, L.L.P.

(57) ABSTRACT

A separator for an electrochemical cell, comprising (A) a flexible perforate support, and (B) a porous ceramic material which fills the perforations in the support and is suitable for receiving an ion-conducting electrolyte, wherein the porous ceramic material comprises a first porous layer which is characterized by an average pore size and also at least one second porous layer for contacting with an electrode, the second porous layer having an average pore size which is smaller than the average pore size of the first porous layer.

20 Claims, 3 Drawing Sheets

U.S. PATENT DOCUMENTS

| | | |
|---|---|---|
| 6,299,778 B1 | 10/2001 | Penth et al. |
| 6,309,545 B1 | 10/2001 | Penth et al. |
| 6,340,379 B1 | 1/2002 | Penth et al. |
| 6,383,386 B1 | 5/2002 | Hying et al. |
| 6,447,958 B1 * | 9/2002 | Shinohara et al. ............ 429/248 |
| 6,620,320 B1 | 9/2003 | Hying et al. |
| 6,689,509 B2 * | 2/2004 | Zucker ....................... 429/145 |
| 6,841,075 B2 | 1/2005 | Penth et al. |
| 2002/0023419 A1 | 2/2002 | Penth et al. |
| 2002/0039648 A1 | 4/2002 | Horpel et al. |
| 2004/0028913 A1 | 2/2004 | Hennige et al. |
| 2004/0038105 A1 | 2/2004 | Hennige et al. |
| 2004/0262169 A1 | 12/2004 | Hying et al. |
| 2005/0031942 A1 | 2/2005 | Hennige et al. |
| 2005/0070193 A1 | 3/2005 | Hennige et al. |
| 2005/0084761 A1 | 4/2005 | Hennige et al. |
| 2005/0087491 A1 | 4/2005 | Hennige et al. |
| 2007/0099072 A1 | 5/2007 | Hennige et al. |
| 2007/0139860 A1 | 6/2007 | Hoerpel et al. |
| 2008/0020190 A1 | 1/2008 | Nun et al. |
| 2008/0032197 A1 | 2/2008 | Horpel et al. |
| 2008/0138700 A1 | 6/2008 | Horpel et al. |
| 2008/0190841 A1 | 8/2008 | Pascaly et al. |
| 2008/0245735 A1 | 10/2008 | Hennige et al. |
| 2008/0248381 A1 | 10/2008 | Hennige et al. |
| 2008/0274394 A1 | 11/2008 | Schormann et al. |

* cited by examiner

SEPARATOR PROVIDED WITH ASYMMETRICAL PORE STRUCTURES FOR AN ELECTROCHEMICAL CELL

The present invention relates to a separator for an electrochemical cell, to a process for producing such a separator and also to an electrochemical cell which comprises such a separator.

As used herein, electrochemical cell or battery refers to batteries and accumulators (secondary batteries) of any kind, especially alkali metal such as for example lithium, lithium ion, lithium polymer, and alkaline earth metal batteries and accumulators, in the form of high energy or high power systems.

Electrochemical cells comprise electrodes of opposite polarity which are separated from each other by a separator while maintaining ion conductivity.

A separator is conventionally a thin porous electro-insulating material possessing high ion permeability, good mechanical strength and long-term stability to the chemicals and solvents used in the system, for example in the electrolyte of the electrochemical cell. In electrochemical cells, the separator should fully electronically insulate the cathode from the anode. Moreover, the separator has to be permanently elastic and to follow movements in the system, for example in the electrode pack in the course of charging and discharging.

The separator is a crucial determinant of the use life of the system in which it is used, for example the use life of an electrochemical cell. The development of rechargeable electrochemical cells or batteries is therefore influenced by the development of suitable separator materials. General information about electrical separators and batteries may be found for example at J. O. Besenhard in "Handbook of Battery Materials" (VCH-Verlag, Weinheim 1999).

High energy batteries are employed in various applications where the decisive requirement is that a very large amount of electrical energy be available. This is the case for example with traction batteries, but also with auxiliary power systems. The energy density is frequently reported in this field per unit weight [Wh/kg] or per unit volume [Wh/L]. Currently, high energy batteries reach energy densities of 350 to 400 Wh/L and of 150 to 200 Wh/kg. The power levels which such batteries are expected to supply are not that high, so that compromises can be made with regard to the internal resistance. In other words, the conductivity of the electrolyte-filled separator for example does not have to be as large as in the case of high power batteries, for example, so that the way is open to the use of other separator designs.

High energy systems, for instance, can even utilize polymer electrolytes whose conductivity at 0.1 to 2 mS/cm is fairly low. Such polymer electrolyte cells cannot be used as high power batteries.

Separator materials for use in high power battery systems have to have the following properties: They need to be very thin to ensure low specific space requirements and to minimize the internal resistance. To ensure these low internal resistances, it is important that the separator also has a high porosity. Further, they have to be light in order that a low specific weight may be achieved. In addition, wettability has to be high, since otherwise unwetted dead zones are formed.

There are many applications, especially mobile applications, where very large amounts of energy are required, eg in traction batteries. The batteries in these applications thus store large amounts of energy in the fully charged state. The separator has to be safe for these batteries, since very large specific electric energy quantities are transported in these batteries. These energies must not in any way be released in an uncontrolled fashion in the event of a dysfunction of the battery or of an accident, since this would ineluctably lead to the cell exploding and going up in flames.

Currently used separators consist predominantly of porous organic polymeric films or of inorganic nonwoven web materials, for example webs composed of glass or ceramic materials or else ceramic papers. These are manufactured by various companies. Important producers here are: Celgard, Tonen, Ube, Asahi, Binzer, Mitsubishi, Daramic and others.

Separators composed of inorganic nonwovens or of ceramic paper are mechanically unstable and break easily. This leads to short circuiting. This is because, first, the electrodes can easily come into contact through broken areas. Secondly, a broken separator facilitates the growth of dendrites, ie treelike structures, of material deposited on the electrode, and this likewise leads to short circuiting and hence to separator failure.

A typical organic separator consists for example of polypropylene or of a polypropylene-polyethylene-polypropylene composite. A substantial disadvantage of these organic polyolefin separators is their relatively low thermal stability limit of below 150° C. Even brief attainment of the melting point of these polymers leads to substantial melting of the separator and to short circuiting in the electrochemical cell utilizing such as separator. The use of such separators is therefore generally not very safe. This is because when higher temperatures are attained, especially temperatures of at least 150° C. or even at least 180° C., these separators are destroyed.

As well as this instability at high temperatures, polymer-based separators have further serious disadvantages with regard to chemical stability. The polymers in the electrochemical cells are slowly but continually attacked by contact with the electrodes even at normal operating and charging temperatures such as room temperature. Problems arise in particular with the use of such separators in electrochemical cells which utilize lithium. The polymer is slowly attacked at the contact surface of the separator with the lithium or the lithiated graphite. Moreover, polymeric separators are also attacked in the interior of the separator by the materials which form during the operation of an electrical cell. As a result, these separators can no longer reliably protect the electrodes against short circuiting. The use life is reduced as a result. In addition, the capacity of an electrochemical cell which utilizes such separators decreases over time.

There have been initial attempts to use inorganic composite materials as separators in order to overcome these disadvantages. For instance, DE 198 38 800 C1 proposes an electrical separator having a composite structure that comprises a sheetlike flexible substrate having a multiplicity of openings and having a coating on the substrate. The material for the substrate is selected from metals, alloys, plastics, glass and carbon fiber or the combination thereof, and the coating is a two-dimensionally continuous porous electrically nonconducting ceramic coating. The use of a ceramic coating promises thermal and chemical stability. The separators, which as exemplified are supported by a carrier or substrate composed of electrically conductive material, however, have been determined to be unsuitable for lithium ion cells, since the coating has proved impossible to produce over a large area without flaws at the thickness described and consequently short circuiting can occur very easily. Nor are such thin metal fabrics as required for very thin separators commercially available. The relatively large pores have a uniform linear distribution. Owing to the relatively high thickness of at least 100 μm for the separators, the large pores do not present a problem with regard to the growth of dendrites.

We were able to show in previous work (DE 101 42 622) that a material comprising a sheetlike flexible substrate having a multiplicity of openings and having a coating on and in this substrate, the material of the substrate being selected from woven or non-woven nonelectroconductive fibers of glass or ceramic or a combination thereof and a coating being a porous electrically insulating ceramic coating, can be used to produce a separator which has a very low thickness of less than 100 μm and is bendable, the resulting separator having a sufficiently low resistance in connection with the electrolyte and yet possessing sufficiently good long-term stability.

The separator described in DE 101 42 622 possesses very high conductivity, but the separator described therein still does not meet the requirements of an industrially useful separator with regard to thickness and weight and also safety. This is because the low thickness of below 100 μm for the separator gives rise to problems in that the relatively large pores in uniform distribution, which ensure good ion conductivity, facilitate the growth of dendrites. For this reason, short circuiting is a frequent occurrence in practice when the thickness of the separators is very low.

In the DE 102 08 277 application, unpublished at the priority date of the present invention, the weight and thickness of the separator was reduced by using a polymeric nonwoven, but the separator embodiments described therein likewise still do not meet all requirements of the separator for a lithium high energy battery, especially because particular emphasis was placed in this application on very large pores for the separator. But the particles described therein, up to 5 μm in size, do not permit the production of very thin separators, only 10-20 μm in thickness for example, since only few particles would come to rest on top of each other here. As a result, the separator would inevitably have a large defective and disruptive site density (eg holes, cracks, . . . ). The large pores, however, do permit the growth of dendrites, which can easily form in the large pores. Accordingly, short circuiting is a frequent occurrence in practice with these separators as well. Moreover, the large particles in this reference consist of $Al_2O_3$ and $ZrO_2$. Owing to the high density of these ceramics, these separators also have high basis weight, which reduces the mass-based specific energy density in Wh/g.

In summary, separators composed of ceramic composites have the following problems. High separator performance is decisively dependent on the ion-conducting properties. The ion conductivity of the separator therefore has to be high. This will best be achieved with coarse macroporous separator materials, which have large, linear pores. But at the same time a very homogeneous current density distribution at the separator surface is desirable. This can be achieved through small particles and a homogeneous distribution of small pores. But in addition the growth of dendrites, ie treelike structures of material deposited on the electrode, must be prevented, since they lead to short circuiting and hence to failure of an electrochemical cell incorporating such a separator. Microporous separator materials having nonlinear pores are most suitable for this. Especially in the case of electrodes having a high roughness is it important that the pores of the separator are distinctly smaller than the particles in the electrodes.

It therefore is an object of the present invention to provide a separator for an electrochemical cell that possesses not only high ion conductivity but also a homogeneous current density distribution at the separator surface and avoids the formation of dendrites effectively even at low layer thicknesses.

This object is achieved by a separator for an electrochemical cell, comprising (A) a flexible perforate support, and (B) a porous ceramic material which fills the perforations in the support and is suitable for receiving an ion-conducting electrolyte, characterized in that the porous ceramic material comprises a first porous layer which is characterized by an average pore size and also at least one second porous layer for contacting with an electrode, the second porous layer having an average pore size which is smaller than the average pore size of the first porous layer.

The expression for contacting with an electrode is to be understood as meaning a contacting with an electrode such that the porous second layer can be assigned an electrode of an electrochemical cell. After installation in an electrochemical cell, this second porous layer is in touch with one of the electrodes of the electrochemical cell and the first porous layer is in touch with the other electrode of the electrochemical cell.

This asymmetrical construction is sufficient for most applications in electrochemical cells. For specific electrochemical cells, however, the separator may also have a structure such that the porous ceramic material comprises on that side of the first porous layer which is opposite the side of the second porous layer a third porous layer for contacting an electrode of opposite polarity, the third layer having an average pore size which is less than the average pore size of the first layer.

Preferably, the average pore size of the second and/or optionally the third layer is in the range from 0.1 to 50% and preferably 0.2 to 30% of the average pore size of the first layer.

The average pore size of the first layer of the separator according to the invention is preferably in the range from 80 to 1 000 nm and especially in the range from 450 to 800 nm. The average pore size of the second layer and/or optionally of the third layer can be in the range from 5 to 250 nm, especially in the range from 25 to 150 nm, preferably in the range from 50 to 120 nm and most preferably in the range from 80 to 120 nm.

In a preferred embodiment, in the separator between the first and second layers and/or optionally between the first and third layers there is or are disposed one or more interlayers whose average pore sizes are each less than the average pore size of the adjacent layer which is in the direction of the first layer and greater than the average pore size of the layer which is in the direction of the electrode assigned this side, ie in the direction of the second and/or third layer.

In a preferred embodiment of the invention, adjacent layers (starting from the first layer in the direction of the second and/or third layer assigned an electrode) each have an average pore size which is from 20 to 50% of the average pore size of the starting layer.

In the separator of the invention, the porous ceramic material may comprise an oxide of zirconium, silicon and/or preferably aluminum.

Advantageously, in the separator according to the invention, the ceramic material is producible by solidifying a slip which contains particles having a large average particle size which determine the pore structure of the ceramic material and also particles having a smaller average primary particle size which adhere the large particles together in the course of the solidification of the slip.

Moreover, in the separator thus producible, the surface of the particles which form the layers may additionally comprise $SiO_2$, $Al_2O_3$, $ZrO_2$ or SiC.

Moreover, the layers of the separator may preferably comprise $Li_2CO_3$, $Li_3N$, $LiAlO_2$, or $Li_xAl_yTi_z(PO_4)_3$ where $1 \leq x \leq 2$, $0 \leq y \leq 1$ and $1 \leq z \leq 2$. The ion conductivity through the separator may preferably be increased thereby.

The porosity of the separator of the invention is preferably in the range from 15 to 80% and preferably in the range from 20% to 45%.

In a preferred embodiment of the present invention, the perforate support comprises fibers, preferably selected from fibers of polyamide, polyacrylonitrile, polyester, eg polyethylene terephthalate (PET) and/or polyolefin, eg polyethylene (PE) or polypropylene (PP), glass fibers or ceramic fibers. When the perforate support comprises polymeric fibers, polymeric fibers other than those mentioned above may be used, provided they not only have the thermal stability required for producing the separators but also are stable under the operating conditions in an electrochemical cell, especially a lithium battery. In a preferred embodiment, the separator according to the invention comprises polymeric fibers having a softening temperature of above 100° C. and a melting temperature of above 110° C.

The support may comprise fibers and/or filaments from 1 to 150 μm and preferably from 1 to 20 μm in diameter and/or yarn from 3 to 150 μm and preferably from 10 to 70 μm in diameter.

In a further embodiment of the invention, the support is a nonwoven having a pore size from 5 to 500 μm and preferably from 10 to 200 μm.

The separator of the invention may be from 10 to 1 000 μm, preferably from 10 to 100 μm and most preferably from 10 to 50 μm in thickness.

The separator of the invention is by virtue of its composite structure able to tolerate a bending radius down to 100 mm, preferably down to 20 mm and most preferably down to 1 mm.

The separator of the present invention is by virtue of its construction according to the invention very useful for electrochemical cells possessing high capacity and high energy density. More particularly, the separator according to the invention is useful for electrochemical cells which are based on the transference of alkali and/or alkaline earth metal ions, such as lithium-metal and lithium ion batteries for example. It is therefore advantageous when the separators also possess the protective measures specific to this application, such as shutdown and meltdown with a high short circuiting temperature. Shutdown refers to a measure in which the separator may have incorporated into it materials which are to be selected for certain operating temperatures and melt easily, such as thermoplastic materials for example. In the event of a rise in the operating temperature due to upsets such as overcharging or external or internal short circuiting, such easy-melting materials can melt and plug the pores of the separator. Thus the ion flux through the separator is partially or completely blocked and a further rise in the temperature is prevented. Meltdown refers to the property that the separator will melt completely at a short circuiting temperature. Large areas of the electrodes in an electrochemical cell can then come into contact and short circuit. A very high short circuiting temperature is desirable for safe operation of an electrochemical cell possessing high capacity and energy density. The separator according to the invention has an important advantage in this respect. This is because the ceramic material which adheres to the perforate support in the case of the separator of the present invention has a melting point which is far above the safety-relevant temperature range for electrochemical cells. The separator of the present invention therefore possesses outstanding safety. This is because, in a preferred safe embodiment, it is stable under service conditions of not less than 50° C. More preferably, it is stable at not less than 100° C., 150° C. and most preferably at not less than 180° C.

Polymeric separators provide for example the safety demanded at present for lithium batteries by stopping any ion transport through the electrolyte from a certain temperature (the shutdown temperature of about 120° C.). This happens because at this temperature the pore structure of the separator collapses and all the pores are closed. Because ions can no longer be transported, the dangerous reaction which can lead to explosion ceases. But if the cell continues to undergo heating because of external circumstances, then the breakdown temperature is exceeded at about 150 to 180° C. At this temperature, the separator melts and contracts. Direct contact then comes about between the two electrodes at many places in the battery cell, leading to internal short circuiting over a large area. This leads to an uncontrolled reaction which ends with an explosion of the cell, or the resultant pressure is released by an overpressure valve (a bursting disk), frequently with signs of fire.

In a particularly preferred embodiment of the invention, the flexible perforate support of the separator comprises polymeric fibers. This hybrid separator, comprising a combination of inorganic components and of polymeric support material, undergoes shutdown when the high temperature causes the polymer structure of the support material to melt and to penetrate into the pores of the inorganic material, thereby closing them. But meltdown does not occur with the separator according to the invention. By virtue of its shutdown mechanism in the battery cells, the separator according to the invention thus meets the requirements, voiced by various battery manufacturers, for a safety switchoff mechanism. The inorganic particles ensure there can never be a meltdown. It is thus ensured that there are no operating states where large-area short circuiting can occur.

It may be preferable for the separator to comprise an additional, noninherent shutdown mechanism. This additional, noninherent shutdown mechanism may be achieved for example when a very thin layer of waxy or polymeric shutdown particles, which melt at a desired shutdown temperature, is present on or in the separator. Particularly preferred materials for shutdown particles include for example natural or artificial waxes, low-melting polymers, for example polyolefins, the material for the shutdown particles being chosen so that the particles melt at the desired shutdown temperature and close the pores of the separator to prevent further ion flux.

Preferably, the shutdown particles have an average particle size ($D_w$) which is not less than the average pore size ($d_s$) of the pores of the porous inorganic layer of the separator. This is advantageous in particular because this prevents penetration and closing of the pores of the separator layer that will result in a reduction in the pore volume and hence in separator performance and also battery performance. The thickness of the shutdown particle layer is only critical insofar as an excessively thick layer would increase the resistance in the battery system unnecessarily. To achieve safe shutdown, the shutdown particle layer should have a thickness ($z_w$) which is approximately in the range from the average particle size of the shutdown particle ($D_w$) up to 10 $D_w$ and preferably in the range from 2 $D_w$ to $D_w$. A thus equipped separator comprises a primary safety feature. In contrast to the all-organic separator materials, however, this separator cannot melt completely and there can never be a meltdown. These safety features are very important for high energy batteries owing to the very large energy quantities and therefore are frequently mandated.

The separator according to the invention is also very safe in the event of internal short circuiting due to an accident for example. If, for example, a nail would puncture a battery, the following would happen, depending on the type of separator: a polymeric separator would melt at the site of puncture (a short circuit current flows through the nail and causes it to heat up) and contract. As a result, the short circuiting location will become larger and larger and the reaction would get out of control. Only the polymeric substrate material at most would melt at the hybridic separator of the present invention, but not the inorganic separator material. So the reaction in the interior of the battery cell following such an accident would proceed much more moderately. This battery is thus distinctly safer than one with a polymeric separator. This is an important factor in mobile applications in particular.

The above-described inventive separator for an electrochemical cell may be produced by the following process, comprising the steps of:

(a) applying a dispersion as a thin layer onto and into a woven and/or nonwoven, the dispersion comprising
  (a1) large ceramic particles whose average particle size provides a pore structure to the layer that is characterized by an average pore diameter, and also
  (a2) ceramic particles having an average primary particle size which is less than the average particle size of the ceramic particles as per (a1),
(b) solidifying the dispersion at a temperature from 100° C. to 680° C. to form a first layer of porous ceramic material,
(c) applying a further dispersion to at least one side of the layer of porous ceramic material, the further dispersion comprising:
  (c1) ceramic particles whose particle size provides a pore structure whose average pore size is less than the average pore size of the layer of porous ceramic material that is coated with the dispersion, and
  (c2) optionally ceramic particles having an average primary particle size which is less than the average particle size of the ceramic particles as per (c1),
(d) solidifying at a temperature from about 100° C. to 680° C. to form a further layer of porous ceramic material and also
(e) optionally repeating steps (c) and (d) to create
  (e1) on the side of the first porous layer that is opposite the side of the second porous layer,
  (e2) on the second porous layer, and/or
  (e3) on optional interlayers (e1) and/or (e2)

one or more further porous layers whose average pore sizes are each smaller than the average pore size of the adjacent layer which is in the direction of the first layer and greater than the average pore size of the layer which is in the direction of the electrode assigned this side.

In this process, the ceramic particles may comprise a material selected from the group consisting of aluminum oxide, silicon oxide and zirconium oxide or of their mixed oxides or mixtures thereof.

The ceramic particles having a small average particle size are producible by hydrolysis and peptization of one or more compounds which are selected from a nitrate, oxynitrate, chloride, oxychloride, carbonate, alkoxide, acetate or acetylacetonate of zirconium, silicon or aluminum.

The surface of the particles which form the layers may preferably additionally contain fine particles which comprise $SiO_2$, $Al_2O_3$, $ZrO_2$ or SiC.

Moreover, the surface of the particles which form the layers may most preferably additionally comprise fine particles which comprise for example $Li_2CO_3$, $Li_3N$, $LiAlO_2$, or $Li_xAl_yTi_z(PO_4)_3$ where $1 \leq x \leq 2$, $0 \leq y \leq 1$ and $1 \leq z \leq 2$. Most preferably, the average particle size of the fine particles is in the range from 0.5 to 30% and preferably in the range from 1 to 15% of the average pore size of the respective first and/or second and optionally the third porous layers of the ceramic materials. This coating of the pore surface of the porous layers of the ceramic materials serves to advantageously increase the use life of the separators.

In a further advantageous embodiment of the process, the dispersion in step (a) and/or (c) comprises at least one oxide of the elements Al, Zr and/or Si and a sol of at least one of the elements Al, Si and/or Zr.

Moreover, in the process according to the invention, the woven and/or nonwoven contains fibers which are selected from polyamide, polyacrylonitrile, polyester or polyolefin.

The dispersion may be applied by printing on, pressing on, pressing in, rolling on, knifecoating on, spreadcoating on, dipping, spraying or pouring on.

The ceramic particles as per (a2) and/or (c2) may preferably be produced by hydrolyzing at least one alkoxide compound of the elements Zr, Al and/or Si or at least one nitrate, carbonate or halide of the elements Zr, Al and/or Si.

Advantageously, the ceramic particles as per (a2) and/or (c2) have an average primary particle size from 4 to 50 nm.

The solidifying is preferably effected at a temperature from 200 to 280° C. within 0.5 to 10 minutes.

The process for applying a dispersion as a thin layer onto and into a flexible perforate support, such as a woven or nonwoven, to produce a composite comprising this flexible perforate support and a porous ceramic material to fill the perforations in the support and the applying of a further dispersion onto at least one side of a layer of porous ceramic material is known in principle from WO 99/15262. However, not all the parameters or ingredients, especially nonelectroconductive ingredients, can be used for producing the separator of the present invention. In particular, the ceramic particles which are used for producing the dispersion and whose average particle sizes have to be defined as described above and also the materials used as a flexible perforate support differ from the ingredients described there.

The dispersion may be applied for example by printing on, pressing on, pressing in, rolling on, knifecoating on, spreadcoating on, dipping, spraying or pouring on onto and into the flexible support or onto one side of a layer of porous ceramic material.

The dispersion used for applying onto and into the flexible perforate support or for applying onto one side of a layer of porous ceramic material may comprise a sol of the elements Al, Zr and/or Si, and is preferably produced by dispersing the ceramic particles and optionally fine particles in one of these sols. The sols are obtainable by hydrolyzing at least one compound with water or an acid or a combination of these compounds. It may be preferable to introduce the compound to be hydrolyzed into an alcohol or an acid or a combination of these liquids prior to hydrolysis. The compound to be hydrolyzed is preferably at least one nitrate, chloride, carbonate, alkoxide of the elements Al, Zr and/or Si. The hydrolysis is preferably carried out in the presence of liquid water, water vapor, ice or an acid or a combination thereof.

In an embodiment of the process according to the invention, hydrolysis of the compounds to be hydrolyzed is used to prepare particulate sols. These particulate sols are notable for the compounds formed by hydrolysis being present in the sol in particulate form. Particulate sols can be prepared as described above or as in WO 99/15262. These sols customarily have a very high water content, which is preferably above 50% by weight. It may be preferable for the compound to be hydrolyzed to be introduced into alcohol or an acid or combination of these liquids prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof. The particulate sols thus produced may subsequently be used for producing dispersions, in which case it is preferable to produce dispersions for application to fiber webs which have been pretreated with polymeric sol.

In a further embodiment of the process according to the invention, hydrolysis of the compounds to be hydrolyzed is used to prepare polymeric sols. In this preferred embodiment of the process according to the invention, the sol has a water and/or acid fraction of less than 50% by weight. These polymeric sols are notable for the fact that the compounds formed by hydrolysis are present in the sol in polymeric form, ie in the form of chains crosslinked across a relatively large space. Polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To produce sols having a desired very low fraction of water and/or acid in the sol, it may be preferable for the compound to be hydrolyzed to be dissolved in an organic solvent, especially ethanol, isopropanol, butanol, amyl alcohol, hexane, cyclohexane, ethyl acetate and/or mixtures thereof, before the actual hydrolysis is carried out. A sol thus produced may be used for producing the separators of the present invention.

Both the particulate sols (high water fraction, low solvent fraction) and polymeric sols (low water fraction, high solvent fraction) are useful as a sol to produce a dispersion in the process of the present invention. Not just sols which are obtainable as just described can be used, but in principle also commercially available sols, for example zirconium nitrate sol or silica sol. The process of producing separators by applying a suspension to and solidifying it on a support is known per se from DE 101 42 622 and in similar form from WO 99/15262, but not all the parameters and ingredients are applicable to the production of the membrane of the present invention.

More particularly, the operation described in WO 99/15262 is in that form not fully applicable to polymeric nonwoven materials, since the very watery sol systems described therein frequently do not permit complete, in-depth wetting of the customarily hydrophobic polymeric nonwovens, since most polymeric nonwovens are only badly wetted by the very watery sol systems, if at all. It has been determined that even the minutest unwetted areas in the nonwoven material can lead to membranes or separators being obtained that have defects and hence are inutile.

It has now been found that, surprisingly, a sol system or dispersion whose wetting behavior has been adapted to the polymers will completely penetrate the nonwoven materials and so provide defect-free coatings. In the process of the present invention, it is therefore preferable to adapt the wetting behavior of the sol or dispersion. This is preferably accomplished by producing sols or dispersions comprising one or more alcohols, for example methanol, ethanol or propanol or mixtures thereof, and/or aliphatic hydrocarbons. But other solvent mixtures are conceivable as well for addition to the sol or suspension in order that the wetting behavior thereof may be adapted to the nonwoven used.

The mass fraction of the suspended component (metal oxide particles) in the dispersion is preferably from 1 to 100 times, more preferably from 1 to 50 times and most preferably from 1 to 10 times that of the sol used. It is particularly preferable for the metal oxide particles used for preparing the dispersion to be aluminum oxide particles which preferably have an average particle size from 0.1 to 10 µm, in particular from 0.5 to 5 µm. Aluminum oxide particles in the range of the preferred particle sizes are available for example from Martinswerke under the designations MDS 6; DN 206, MZS 3 and MZS 1 and from Alcoa with the designation CL3000 SG, CT800 SG and HVA SG.

It has been determined that the use of commercially available metal oxide particles may in certain circumstances lead to unsatisfactory results, since the particle size distribution is frequently very large. It is therefore preferable to use metal oxide particles which were classified by a conventional process, for example wind sifting, centrifugation and hydroclassification. It is preferable for the metal oxide particles used to be a fraction for which the coarse grain fraction, which accounts for up to 10% of the total amount, was separated off by wet sieving. This unwelcome coarse grain fraction, which is very difficult or impossible to comminute even by the typical processes of slip production such as, for example, grinding (ball mill, attritor mill, pestle mill), dispersing (Ultra-Turrax, Ultrasound), trituration or chopping, can consist for example of aggregates, hard agglomerates, grinding media attritus. The aforementioned measures ensure that the inorganic porous layer has a very uniform pore size distribution. This is achieved in particular by using metal oxide particles whose maximum particle size is preferably from ⅓ to ⅕ and more preferably more than 1/10 of the thickness of the nonwoven used.

Table 1 hereinbelow gives an overview of how the choice of the various aluminum oxides affects the porosity and the resulting pore size of the respective porous inorganic coating. To determine these data, the corresponding slips (suspensions or dispersions) were prepared and dried and solidified as pure moldings at 200° C.

TABLE 1

Typical data of ceramics as a function of powder type used

| Al$_2$O$_3$ type | Porosity/% | Average pore size/nm |
|---|---|---|
| AlCoA CL3000SG | 51.0 | 755 |
| AlCoA CT800SG | 53.1 | 820 |
| AlCoA HVA SG | 53.3 | 865 |
| AlCoA CL4400FG | 44.8 | 1015 |
| Martinsw. DN 206 | 42.9 | 1025 |
| Martinsw. MDS 6 | 40.8 | 605 |
| Martinsw. MZS 1 + Martinsw. MZS 3 = 1:1 | 47% | 445 |
| Martinsw. MZS 3 | 48% | 690 |

To improve the adhesion of the inorganic components to polymeric fibers as a substrate, it can be advantageous for the suspensions used to be admixed with adhesion promoters, for example organofunctional silanes. Useful adhesion promoters include in particular compounds selected from the octylsilanes, the vinylsilanes, the amine-functionalized silanes and/or the glycidyl-functionalized silanes, for example the Dynasilanes from Degussa. Particularly preferred adhesion promoters for polymeric fibers such as polyethylene (PE) and polypropylene (PP) are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The adhesion promoters accordingly have to be selected so that the solidification temperature is below the melting or softening temperature of the polymer used as substrate and below its decomposition temperature. Dispersions according to the present invention preferably include distinctly less than 25% by weight and more preferably less than 10% by weight of compounds capable of acting as adhesion promoters. An optimal fraction of adhesion promoter results from coating the fibers and/or particles with a mono-molecular layer of the adhesion promoter. The amount in grams of adhesion promoter required for this purpose can be obtained by multiplying the amount in g of the oxides or fibers used by the specific surface area of the materials in $m^2g^{-1}$ and then dividing by the specific area required by the adhesion promoter in $m^2g^{-1}$, the specific area required frequently being in the order of from 300 to 400 $m^2g^{-1}$.

Table 2 which follows contains an illustrative overview of usable adhesion promoters based on organofunctional silicon compounds for typical nonwoven material polymers.

TABLE 2

| Polymer | Organofunctional type | Adhesion promoter |
|---|---|---|
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |
| PE, PP | Amino | AMEO, AMMO |
|  | Vinyl | VTMO, VTEO, Silfin |
|  | Methacryloyl | MEMO | where:
AMEO=3-aminopropyltriethoxysilane
DAMO=2-aminoethyl-3-aminopropyltrimethoxysilane
GLYMO=3-glycidyloxytrimethoxysilane
MEMO=3-methacryloyloxypropyltrimethoxysilane
Silfin=vinylsilane+initiator+catalyst
VTEO=vinyltriethoxysilane
VTMO=vinyltrimethoxysilane
VTMOEO=vinyltris(2-methoxyethoxy)silane In a particular embodiment of the process according to the present invention, the abovementioned adhesion promoters are applied to the flexible perforate support such as a polymeric nonwoven for example in a preceding step. To this end, the adhesion promoters are dissolved in a suitable solvent, for example ethanol. This solution may additionally include a small amount of water, preferably from 0.5 to 10 times the molar amount of the hydrolyzable group, and small amounts of an acid, for example HCl or $HNO_3$, as a catalyst for the hydrolysis and condensation of the Si—OR groups. This solution is applied to the substrate by the familiar techniques, for example spraying on, printing on, pressing on, pressing in, rolling on, knifecoating on, spreadcoating on, dipping, spraying or pouring on, and the adhesion promoter is fixed on the substrate by a thermal treatment at from 50 to not more than 350° C. It is only after the adhesion promoter has been applied in this embodiment of the process according to the present invention that the dispersion is applied and solidified.

Application of an adhesion promoter prior to the actual application of the dispersion provides improved adhesivity of the flexible substrates especially with regard to aqueous particulate sols, which is why especially thus pretreated substrates can be coated according to the present invention with suspensions based on commercially available sols, for example zirconium nitrate sol or silica sol. But this way of applying an adhesion promoter also means that the production process of the separator according to the present invention has to be extended to include an intervening or preliminary treatment step. This is feasible albeit more costly and inconvenient than the use of adapted sols to which adhesion promoters have been added, but also has the advantage that better results are obtained even on using dispersions based on commercially available sols.

The coatings according to the invention are applied to the substrate by solidifying the dispersion in and on the substrate and onto at least one side of a layer of porous ceramic material. According to the present invention, the dispersion present on and in the substrate or on one side of a layer of porous ceramic material can be solidified by heating at from 50 to 350° C. Since the maximum temperature is dictated by the polymeric nonwoven used when polymeric substrate materials are used, the maximum temperature must be adapted accordingly. Thus, depending upon the embodiment of the process according to the present invention, the dispersion present on and in the nonwoven is solidified by heating at from 100 to 350° C. and most preferably by heating at from 110 to 280° C. It can be advantageous for the heating to take place at from 100 to 350° C. for from 1 second to 60 minutes. It is more preferable to solidify the dispersion by heating at from 110 to 300° C. and most preferably at from 110 to 280° C. and preferably for from 0.5 to 10 min.

The assembly may be heated according to the present invention by means of heated air, hot air, infrared radiation or by other heating methods according to the prior art.

The process according to the present invention can be carried out for example by unrolling the flexible substrate for example a polymeric nonwoven and/or the composite of a previously coated support off a roll, passing it at a speed of from 1 m/h to 2 m/s, preferably at a speed of from 0.5 m/min to 20 m/min and most preferably at a speed of from 1 m/min to 5 m/min through at least one apparatus which applies the suspension atop and into the substrate, for example a roller, and at least one further apparatus whereby the dispersion is solidified on and in the support by heating, for example an electrically heated furnace, and rolling the separator thus produced up on a second roll. This makes it possible to produce the separator according to the present invention in a continuous process. Similarly, the pretreatment steps can be carried out on a continuous basis by observing the parameters mentioned.

It has been determined to be particularly advantageous for the process to be carried out with the substrate (uncoated or just coated) and especially the polymeric nonwoven having a maximum tension of 10 N/cm and preferably of 3 N/cm in the longitudinal direction during the coating operation or operations. The term "coating operations" refers in this context to all process steps in which a material is brought onto and into the uncoated or coated substrate and is solidified there by heat treatment, ie including the application of the adhesion promoter. Preferably, the substrate is tensioned with a maximum force of 0.01 N/cm during the coating operations. It may be particularly preferable for the substrate to be tensionless in the longitudinal direction during the coating operation or operations.

The pulling tension can be controlled during the coating in order that no deformation, even an elastic one, of the carrier material may take place. Possible deformation (stretching) due to excessive pulling tension can mean that the ceramic coating cannot follow the substrate material of construction, the consequence being that the coating will become detached from the nonwoven material over the entire area. The resulting product can then not be used for the intended purpose.

The separator according to the present invention may be equipped with an additional automatic shutdown mechanism by, for example, applying a layer of particles which, at a desired temperature, melt and close the pores of the separator, so-called shutdown particles, to the separator after the solidification of the applied dispersion on the substrate to create a shutdown mechanism, and fixing the layer of shutdown particles. The layer of shutdown particles can be created for example by applying a suspension of waxy particles having an average particle size larger than the average pore size of the separator in a sol, water, solvent or solvent mixture.

The suspension for applying the particles contains preferably from 1 to 50% by weight, more preferably from 5 to 40% by weight and most preferably from 10 to 30% by weight of shutdown particles, especially wax particles, in the suspension.

Since the inorganic coating on the separator frequently has a very hydrophilic character, it has been determined to be advantageous for the coating on the separator to be prepared using a silane in a polymeric sol as an adhesion promoter and thus be hydrophobicized. To achieve good adhesion and uniform dissipation of the shutdown particles in the shutdown layer on hydrophilic as well as hydrophobic porous inorganic separator layers, there are several possibilities.

In one version of the process according to the present invention, it has been determined to be advantageous to hydrophobicize the porous inorganic layer of the separator before the shutdown particles are applied. The production of hydrophobic membranes which works according to the same principle is described in WO 99/62624 for example. Preferably, the porous inorganic coating is hydrophobicized by treatment with alkyl-, aryl- or fluoroalkylsilanes marketed for example by Degussa under the tradename of Dynasilane. It is possible in this context to employ for example the familiar hydrophobicization methods which are employed inter alia for textiles (D. Knittel; E. Schollmeyer; Melliand Textilber. (1998) 79(5), 362-363), with minimal changes to the recipes, for the porous coatings on the separator as well. To this end, the coating or separator is treated with a solution which includes at least one hydrophobic material. It can be advantageous for the solvent in the solution to be water, preferably adjusted to a pH of 1-3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy-(3,3,4,4,5,5,6,6,7,7,8,8-tridecafluorooctyl)silane, but a treatment with methyltriethoxysilane or i-butyl-triethoxysilane is completely sufficient to obtain the desired effect. The solutions are stirred at room temperature to achieve uniform dissipation of the hydrophobic materials in the solution and subsequently applied to the inorganic coating on the separator and dried. Drying can be speeded up by treatment at temperatures from 25 to 100° C.

In a further version of the process according to the present invention, the porous inorganic coating can also be treated with other adhesion promoters before the shutdown particles are applied. The treatment with one of the hereinbelow mentioned adhesion promoters can then likewise be effected as described above, ie by treating the porous inorganic layer with a polymeric sol which includes a silane adhesion promoter.

The layer of shutdown particles is preferably created by applying to the inorganic coating on the separator a suspension of shutdown particles in a suspension medium selected from the group consisting of a sol, water, solvents, for example alcohol, ether or ketones, and a solvent mixture and then drying. The particle size of the shutdown particles present in the suspension is arbitrary in principle. However, it is advantageous for the suspension to include shutdown particles having an average particle size ($D_w$) of not less than and preferably greater than the average size of the pores of the porous inorganic layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

To employ shutdown particles smaller in size than the pores of the porous inorganic layer, the particles must be prevented from penetrating into the pores of the porous inorganic separator layer. Reasons for employing such particles include for example large price differences, but also availability. One way of preventing the penetration of shutdown particles into the pores of the porous inorganic layer is to control the viscosity of the suspension in such a way that absent external shearing forces no penetration of the suspension into the pores of the inorganic layer on the separator takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 50% by weight and preferably from 0.5% to 10% by weight of silica, based on the suspension, will frequently be sufficient to achieve a sufficiently high viscosity for the suspension. The fraction of auxiliaries can in each case be determined by simple preliminary tests.

It can be advantageous for the suspension used, which contains shutdown particles, to contain adhesion promoters. Such a suspension with adhesion promoter can be applied directly to an inorganic layer of the separator even when the layer was not hydrophobicized beforehand. It will be appreciated that a suspension with adhesion promoter can also be applied to a hydrophobicized layer or to a separator layer which has been made employing an adhesion promoter. Adhesion promoters useful in the shutdown particle suspension are preferably silanes having amino, vinyl or methacryloyl side groups. Such adhesion promoters include for example AMEO (3-aminopropyltriethoxy-silane), MEMO (3-methacryloyloxypropyltrimethoxy-silane), Silfin (vinylsilane+initiator+catalyst), VTEO (vinyltriethoxysilane) or VTMO (vinyltrimethoxy-silane). Such silanes are available for example from Degussa as an aqueous solution under the designation Dynasilane 2926, 2907 or 2781. An adhesion promoter fraction of not more than 10% by weight has been determined to be sufficient for ensuring sufficient adhesion of the shutdown particles to the porous inorganic layer. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of polypropylene or polyethylene wax.

The shutdown particle suspension may be applied to the porous inorganic layer of the separator by printing on, pressing on, pressing in, rolling on, knifecoating on, spreadcoating on, dipping, spraying or pouring on. The shutdown layer is preferably obtained by drying the applied suspension at a temperature from room temperature to 100° C. and preferably from 40 to 60° C.

It may be preferable for the shutdown particles to be fixed after they have been applied to the porous inorganic layer, by heating one or more times to a temperature above the glass transition temperature, so that the particles are fused on without undergoing a change in the actual shape. This makes it possible to ensure that the shutdown particles adhere particularly firmly to the porous inorganic separator layer.

The applying of the shutdown particle suspension with subsequent drying and any heating to above the glass transition temperature can be carried out continuously or quasicontinuously. When the starting material used is a flexible separator it can again be unwound off a roll, passed through a coating, drying and, if used, heating apparatus and then be rolled up again.

The invention also provides an electrochemical cell, especially a lithium battery, lithium ion battery or a lithium polymer battery, comprising one of the above-described separators which comprises a first layer having an average pore size from 50 to 1 000 nm and at least one further layer having an average pore size from 5 to 400 nm.

The electrolyte which is used in such an electrochemical cell can be any customary electrolyte which can be used in electrochemical cells. Examples which can be mentioned include solutions of a soluble lithium salt in one or more organic solvents, for example ethylene carbonate and dimethyl carbonate (EC-DMC). Other suitable nonaqueous solvents include for example γ-butyrolactone, tetrahydrofuran, 1,2-dimethoxyethane, propylene carbonate, diethyl carbonate, methyl ethyl carbonate, diethoxyethane, dioxolane and methyl formate. Suitable soluble lithium salts are those customarily used. Examples which may be mentioned include $LiPF_6$, $LiAsF_6$, $LiBF_4$, $LiClO_4$, $LiCF_3SO_3$, $LiN(CF_3SO_2)_3$ and $LiN(C_2F_5SO_2)_3$, of which $LiPF_6$ is particularly preferred.

The present invention also includes the use of an inventive separator for producing an electrochemical cell, especially a lithium battery, lithium ion battery or a lithium polymer battery, each preferably for high current applications.

Preferably, the electrochemical cell is rechargeable.

By average pore size and porosity is meant the pore size and porosity which can be determined by the familiar method of mercury porosimetry using a 4000 porosimeter from Carlo Erba Instruments. Mercury porosimetry rests on the Washburn equation (E. W. Washburn, "Note on a Method of Determining the Distribution of Pore Sizes in a Porous Material", Proc. Natl. Acad. Sci., 7, 115-16 (1921)).

In general, for the same porosity and tortuosity, the larger the pores in the separator, the smaller the resistance which results for the electrolyte-drenched separator. A separator parameter which is frequently used in this connection is the Gurley number. It is a measure of the gas permeability of the dry porous separator. As described by O. Besenhard in "Handbook of Battery Materials", the Gurley number permits direct deductions about the conductivity of a known system. It can be stated in generalized form that a higher gas permeability (ie smaller Gurley number) brings about a correspondingly higher conductivity for the wetted separator in the battery cell. The Gurley numbers of commercially available separators are in the range from 10 to 50 when the pore diameter is around 0.1 μm and in the range from 20 to 100 when the pore diameter is around 0.05 μm (G. Venugiopal; J. of Power Sources 77 (1999) 34-41).

The Gurley number reported in the inventive and reference examples is defined as follows. The Gurley number is the time needed in seconds for 100 ml of air to pass through a separator area of 6.45 $cm^2$ under a hydrohead of 31 cm.

The MacMullin number is defined as follows:

$$\text{MacMullin number} = \frac{\text{Conductivity of pure electrolyte measured at 2.4 kHz}}{\text{Conductivity of electrolyte-filled separator measured at 2.4 kHz}}$$

The MacMullin number is always not less than 1. It describes a kind of "dilution" of the electrolyte. When for example the MacMullin number is 3, the porosity will be about 33% and the tortuosity=1.

The present invention will now be described using inventive, test and reference examples.

INVENTIVE, TEST AND REFERENCE EXAMPLES

Reference Example 1

Production of an S100PET Separator

To 145 g of water are initially added 30 g of a 5% by weight aqueous HCl solution, 10 g of tetraethoxysilane, 2.5 g of methyltriethoxysilane and 7.5 g of the Dynasilane GLYMO. This sol, which was initially further stirred for some hours, was then used to suspend 140 g of the AlCoA CT3000 aluminum oxide. This suspension (slip) is homogenized with a magnetic stirrer for at least a further 72 h, during which the stirred vessel has to be covered over in order that no solvent may be lost.

The above suspension is then used to coat a 56 cm wide PET nonwoven having a thickness of about 13 µm and a basis weight of about 6 g/m² in a continuous roller coating process at a belt speed of about 30 m/h and T=200° C. This provides a separator having an average pore size of 80 nm, which possesses very good adhesion and a thickness of about 24 µm. The Gurley number is about 65 and the MacMullin number 5.5.

Reference Example 2

Production of an S240PET Separator

To 140 g of water and 10 g of ethanol are initially added 30 g of a 5% by weight aqueous HCl solution, 10 g of tetraethoxysilane, 2.5 g of methyltriethoxysilane and 7.5 g of the Dynasilane GLYMO. This sol, which was initially further stirred for some hours, was then used to suspend 265 g of the AlCoA CT1200 aluminum oxide. This suspension (slip) is homogenized with a magnetic stirrer for at least a further 24 h, during which the stirred vessel has to be covered over in order that no solvent may be lost.

The above slip is then used to coat a 56 cm wide PET nonwoven having a thickness of about 13 µm and a basis weight of about 6 g/m² in a continuous roller coating process at a belt speed of about 30 m/h and T=200° C. This provides a separator having an average pore size of 240 nm, which possesses very good adhesion and a thickness of about 27 µm. The Gurley number is about 12 and the MacMullin number 3.5.

Reference Example 3

Production of an S450PET Separator

To 130 g of water and 15 g of ethanol are initially added 30 g of a 5% by weight aqueous $HNO_3$ solution, 10 g of tetraethoxysilane, 2.5 g of methyltriethoxysilane and 7.5 g of the Dynasilane GLYMO. This sol, which was initially further stirred for some hours, was then used to suspend 125 g each of the Martoxid MZS-1 and Martoxid MZS-3 aluminum oxides. This suspension (slip) is homogenized with a magnetic stirrer for at least a further 24 h, during which the stirred vessel has to be covered over in order that no solvent may be lost.

The above suspension is then used to coat a 56 cm wide PET nonwoven having a thickness of about 13 µm and a basis weight of about 6 g/m² in a continuous roller coating process at a belt speed of about 30 m/h and T=200° C. This provides a separator having an average pore size of 450 nm, which possesses very good adhesion and a thickness of about 29 µm. The Gurley number is about 6 and the MacMullin number 3.4.

Reference Example 4

Production of an S800PET Separator

To 130 g of water and 15 g of ethanol are initially added 30 g of a 5% by weight aqueous HCl solution, 10 g of tetraethoxysilane, 2.5 g of methyltriethoxysilane- and 7.5 g of the Dynasilane GLYMO. This sol, which was initially further stirred for some hours, was then used to suspend 280 g of the AlCoA CT800 SG aluminum oxide. This suspension (slip) is homogenized with a magnetic stirrer for at least a further 24 h, during which the stirred vessel has to be covered over in order that no solvent may be lost.

The above slip is then used to coat a 56 cm wide PET nonwoven having a thickness of about 35 µm and a basis weight of about 18 g/m² in a continuous roller coating process at a belt speed of about 30 m/h and T=200° C. This provides a separator having an average pore size of 800 nm, which possesses very good adhesion and a thickness of about 55 µm. The Gurley number is about 5.7 and the MacMullin number 2.5.

Figure 1A:
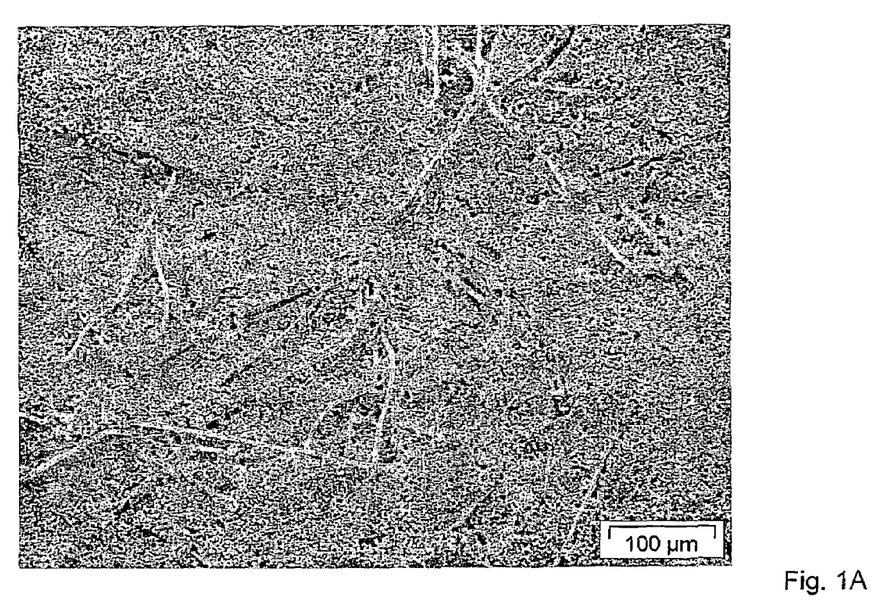
FIGS. 1A and 1B show: scanning electron micrographs of the symmetrical pore structure separator produced in reference example 4.
Figure 1B:
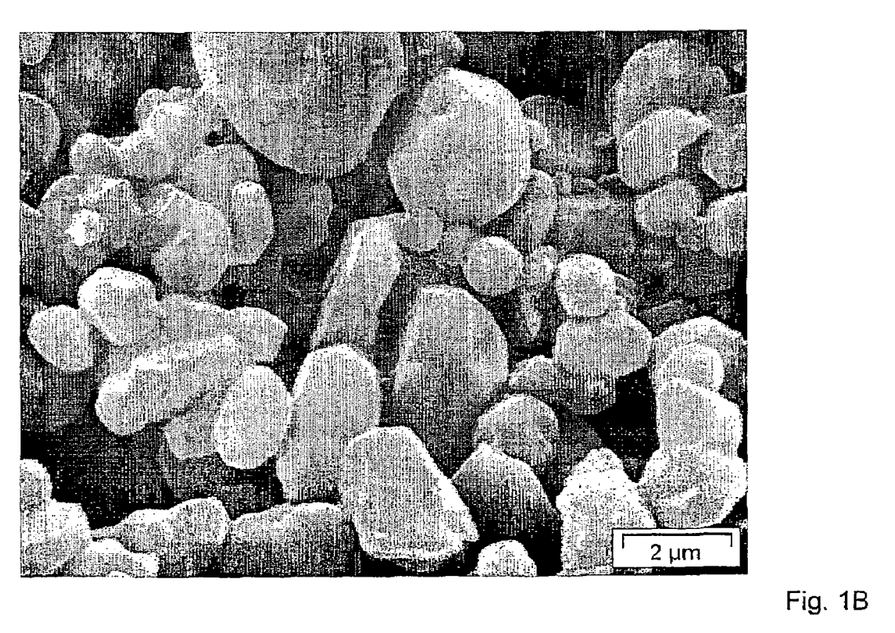

Scanning electron micrographs of the separator: see FIGS. 1A and 1B. The scale for FIG. 1A, shown at bottom right in the corner, is 100 µm; and for FIG. 1B is 2 µm.

Test Example 1

Lithium Battery with S100PET Separator from Reference Example 1

The S100PET separator produced in reference example 1 was installed in a lithium ion cell consisting of a positive mass of $LiCoO_2$, a negative mass consisting of graphite and an electrolyte of $LiPF_6$ in ethylene carbonate/dimethyl carbonate (EC/DC) [$LiCoO_2$//S100PET, EC/DMC 1:1, 1M $LiPF_6$//graphite]. The charging behavior of this battery was tested. After more than 250 cycles at C/5, the battery exhibited only a minimal drop in capacity of a few percentage points. Even increasing the charging voltage from 4.1 to 4.2 in the 200th charging cycle did not harm the battery.

But on increasing the load to 1C, a decrease in cell capacity was observed on discharging, ie it was impossible to get the total available capacity out of the battery. This is attributable to the comparatively high internal resistance of the cell. The high internal resistance can be predicted from the high Gurley and MacMullin numbers of the separator. At no time was the cell observed to short circuit.

Test Example 2

Lithium Battery with S800PET Separator from Reference Example 4

The S800PET separator produced in reference example 4 was installed in a lithium ion cell consisting of a positive mass of $LiCoO_2$, a negative mass consisting of graphite and an electrolyte of $LiPF_6$ in ethylene carbonate/dimethyl carbonate (EC/DMC) [$LiCoO_2$//S800PET, EC/DMC 1:1, 1M $LiPF_6$//graphite]. The charging behavior of this battery was tested. After more than 250 cycles, the battery exhibited only a minimal drop in capacity of a few percentage points. Even increasing the charging voltage from 4.1 to 4.2 in the 200th charging cycle did not harm the battery.

This cell proved to be operable not only at small loads (such as C/5), say, but also at higher loads of not less than 1C without capacity being lost as in test example 1. Equipped with the S800PET separator, the battery thus had a comparatively low internal resistance. The low internal resistance can be predicted from the low Gurley and MacMullin numbers of the separator. However, these cells were frequently observed to give rise to outages which are attributable to internal short circuiting. This short circuiting is favored by the comparatively large pores in the separator.

Production of Inventive Asymmetrical Separators

Inventive Example 1

Production of a Z025$^A$PET Separator

A suspension consisting of 3.0% by weight of nanoparticulate zirconium oxide (VPH, from Degussa), 1% by weight of zirconium oxide sol (from MEL) and 1.0% by weight of Aerosil 300 (from Degussa) as a viscosity regulator in deionized water, was applied to an S100PET separator from reference example 1 in a continuous rolling coating process at a belt speed of about 8 m/h and T=220° C. and solidified.

The separator obtained had an average pore size of about 25 nm for the asymmetrical layer, very good adhesion and a thickness of about 27 μm. It was not possible to produce a pure, nonasymmetrical Z025 separator. The Gurley number was about 261.

Inventive Example 2

Production of a T010$^4$PET separator

A mixture of 1 809 of DI water and 0.69 g of 65% nitric acid was slowly admixed with a mixture of 14.21 g of titanium tetraisopropoxide (Fluka) in 27.1 g of ipropanol by dropwise addition. The resultant titanium dioxide is peptized over a period of 17 days with occasional stirring. The sol thus produced is then further processed into a coating suspension. To this end, a suspension consisting of 0.3% by volume of TiO$_2$ (from the sol described above) is mixed with 0.2% by volume of Carbopol 980 and applied to the separator of inventive example 1. (Belt speed about 16 m/h, T=220° C.).

The separator obtained had an average pore size of about 10 nm for the asymmetrical layer, very good adhesion and a thickness of about 29 μm. The Gurley number was about 410. The production of a pure, nonasymmetrical T010PET separator was not possible.

Inventive Example 3

Production of a Z100$^4$PET Separator 250 g of AlCoA CT3000 SG aluminum oxide and 6 g of Aerosil200 (Degussa AG) are dispersed in a mixture of 220 g of water, 15 g of ethanol, 5 g of a 5% by weight aqueous HNO$_3$ solution and 50 g of 30% by weight zirconium oxide sol (from MEL). This suspension (slip) is homogenized with a magnetic stirrer for at least 72 h, during which the stirred vessel has to be covered over in order that no solvent may be lost.

The thus homogenized slip was applied to an S450PET separator from reference example 3 in a continuous roller coating process at a belt speed of about 15 m/h and T=220° C. and solidified.

The separator obtained has an average pore size of about 80 nm for the asymmetrical layer, very good adhesion and a thickness of about 33 μm. The Gurley number was about 50, the MacMullin number 5.

Inventive Example 4

Production of a Z100$^4$PET Separator 250 g of AlCoA CT3000 SG aluminum oxide and 6 g of Aerosil200 (Degussa AG) are dispersed in a mixture of 220 g of water, 15 g of ethanol, 5 g of a 5% by weight aqueous HNO$_3$ solution and 50 g of 30% by weight zirconium oxide sol (from MEL). This suspension (slip) is homogenized with a magnetic stirrer for at least 72 h, during which the stirred vessel has to be covered over in order that no solvent may be lost.

The thus homogenized slip was applied to an S800PET separator from reference example 4 in a continuous roller coating process at a belt speed of about 15 m/h and T=220° C. and solidified.

The separator obtained has an average pore size of about 80 nm for the asymmetrical layer, very good adhesion and a thickness of about 61 μm. The Gurley number was about 68, the MacMullin number 3.9.

Figure 3A:
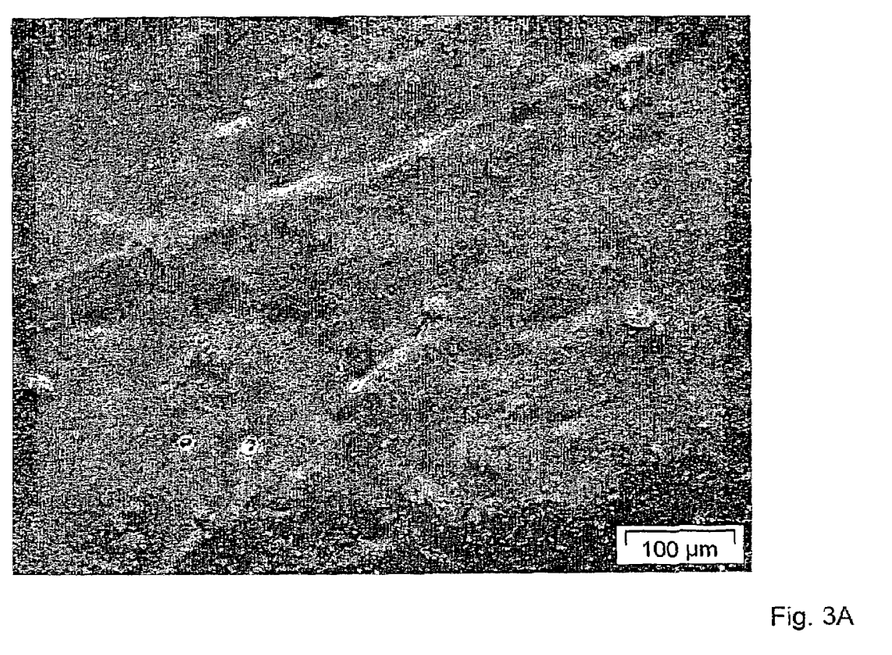
FIGS. 3A and 3B show scanning electron micrographs of the second porous layer of the inventive asymmetrical pore structure separator produced in inventive example 4.
Figure 3B:
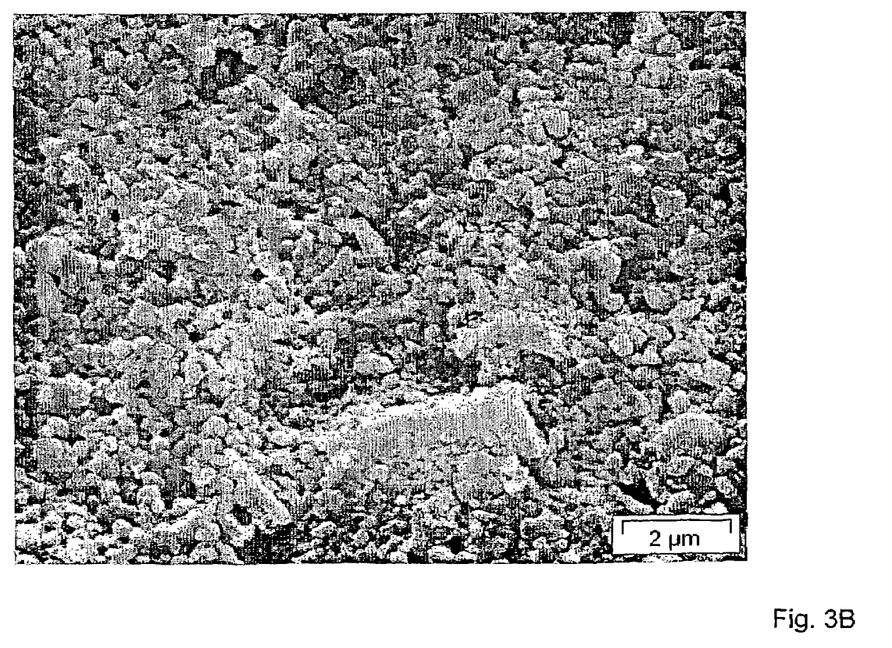

Scanning electron micrographs of the separator: see FIGS. 3A and 3B. FIGS. 3A and 3B each depict the second porous layer of an inventive separator. The scale in FIG. 3A, depicted at bottom right in the corner, is 100 μm; in FIG. 3B it is 2 μm. The first porous layer of the separator according to the invention has a porosity as seen in FIGS. 1A and 1B.

Inventive Example 5

Production of a Z240$^4$PET Separator 250 g of AlCoA CT3000 SG aluminum oxide and 6 g of Aerosil200 (Degussa AG) are dispersed in a mixture of 220 g of water, 15 g of ethanol, 5 g of a 5% by weight aqueous HNO$_3$ solution and 50 g of 30% by weight zirconium oxide sol (from MEL). This suspension (slip) is homogenized with a magnetic stirrer for at least 72 h, during which the stirred vessel has to be covered over in order that no solvent may be lost. The thus homogenized slip was applied to an S450PET separator from reference example 3 in a continuous roller coating process at a belt speed of about 15 m/h and T=220° C. and solidified.

The separator obtained has an average pore size of about 240 nm for the asymmetrical layer, very good adhesion and a thickness of about 33 μm. The Gurley number was about 20, the MacMullin number 4.1.

Inventive Example 6

Production of a Z240$^4$PET Separator 250 g of AlCoA CT3000 SG aluminum oxide and 6 g of Aerosil200 (Degussa AG) are dispersed in a mixture of 220 g of water, 15 g of ethanol, 5 g of a 5% by weight aqueous HNO$_3$ solution and 50 g of 30% by weight zirconium oxide sol (from MEL). This suspension (slip) is homogenized with a magnetic stirrer for at least 72 h, during which the stirred vessel has to be covered over in order that no solvent may be lost.

The thus homogenized slip was applied to an S800PET separator from reference example 4 in a continuous roller coating process at a belt speed of about 15 m/h and T=220° C. and solidified.

The separator obtained has an average pore size of about 240 nm for the asymmetrical layer, very good adhesion and a thickness of about 35 μm. The Gurley number was about 25, the MacMullin number 3.7.

Figure 2A:
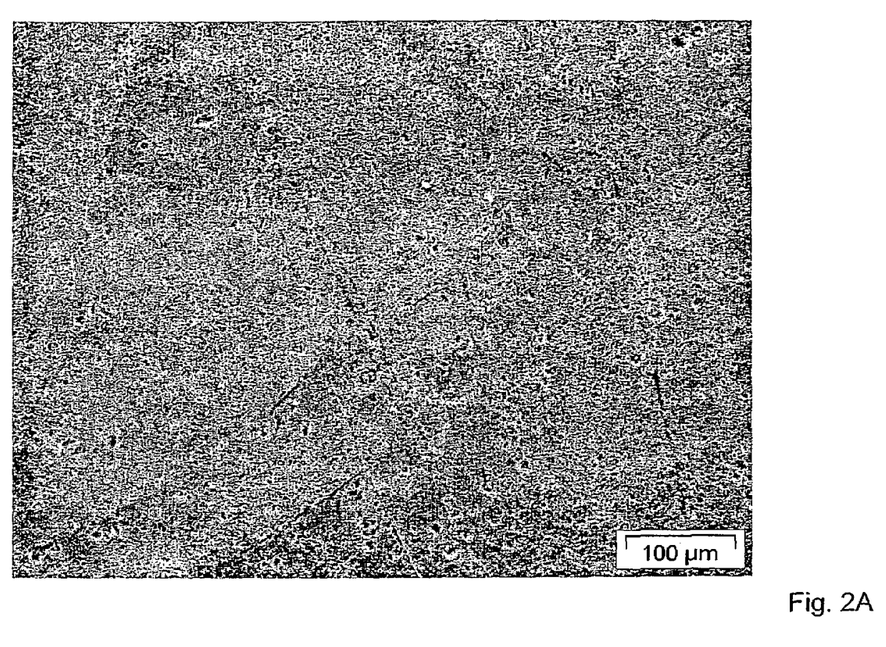
FIGS. 2A and 2B show scanning electron micrographs of the second porous layer of the inventive asymmetrical pore structure separator produced in inventive example 6.
Figure 2B:
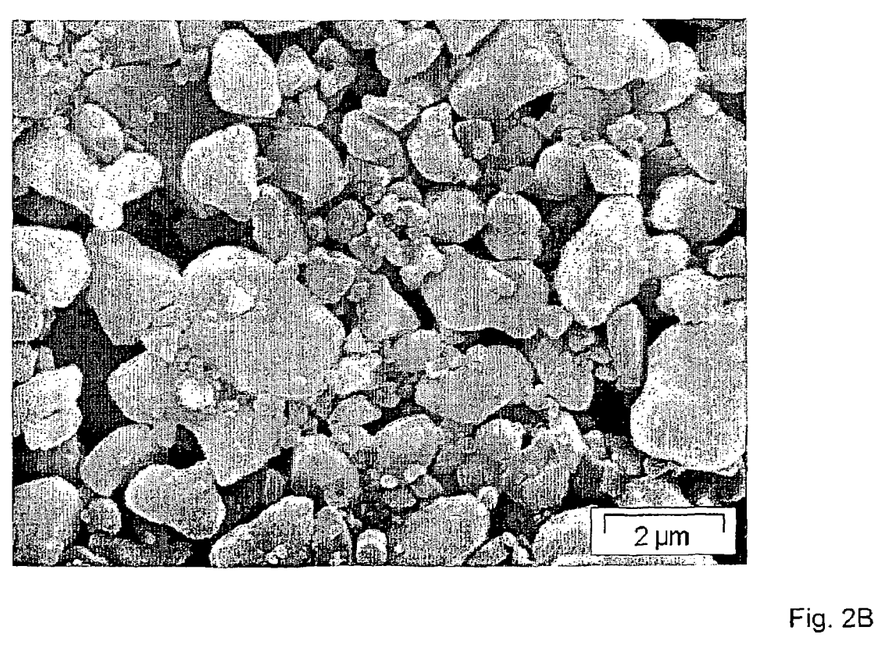

Scanning electron micrographs of the separator: see FIGS. 2A and 2B. FIGS. 2A and 2B each depict the second porous layer of an inventive separator. The scale in FIG. 2A, depicted at bottom right in the corner, is 100 μm; in FIG. 2B it is 2 μm. The first porous layer of the separator according to the invention has a porosity as seen in FIGS. 1A and 1B.

Test Example 3

Lithium Battery with the Inventive Asymmetrical Z100$^4$PET Separator

The Z100$^4$PET separator produced in inventive example 4 was installed in a lithium ion cell consisting of a positive mass of LiCoO$_2$, a negative mass consisting of graphite and an electrolyte of LiPF$_6$ in ethylene carbonate/dimethyl carbonate (EC/DMC) [LiCoO$_2$//Z100$^4$PET, EC/DMC 1:1, 1M LiPF$_6$//graphite] so that the layer with the small pores faced the graphite anode. The charging behavior of this battery was tested. After more than 500 cycles, the battery exhibited only a minimal drop in capacity of a few percentage points. Even increasing the charging voltage from 4.1 to 4.2 in the 450th charging cycle did not harm the battery.

This cell proved to be operable not only at small loads (such as C/5), say, but also at higher loads of not less than 1C without capacity being lost as in test example 1. Equipped with the Z100$^4$PET separator, the battery thus had a comparatively low internal resistance. The low internal resistance can be predicted from the Gurley and MacMullin numbers of the separator. In contradistinction to test example 2, the separator according to the invention did not give rise to battery outages which are attributable to internal short circuiting.

The separators according to the invention thus combine the advantages of large pores, which produce low internal resistances, and small pores in contact with the electrodes, which help avoid short circuiting.

What is claimed is:

1. A separator for an electrochemical cell, comprising
   (A) a flexible perforate support, and
   (B) a porous ceramic material which fills the perforations in the support and is suitable for receiving an ion-conducting electrolyte,
   characterized in that
   the porous ceramic material comprises a first continuous porous layer which is characterized by an average pore size and also at least one second continuous porous layer for contacting with an electrode, the second continuous porous layer having an average pore size which is smaller than the average pore size of the first continuous porous layer.

2. The separator of claim 1, characterized in that the porous ceramic material comprises on that side of the first continuous porous layer which is opposite the side of the second continuous porous layer a third porous layer for contacting an electrode of opposite polarity, the third layer having an average pore size which is less than the average pore size of the first layer.

3. The separator of claim 1, wherein the average pore size of the second and/or optionally a third porous layer is from 0.1 to 50% of the average pore size of the first layer.

4. The separator of claim 1, wherein the average pore size of the first layer is from 80 to 1000 nm.

5. The separator of claim 1, wherein the average pore size of the second layer and optionally of a third layer is from 5 to 250 nm.

6. The separator of claim 1, wherein between the first and second layers and/or optionally between the first and a third layer there is disposed at least one interlayer whose average pore size is less than the average pore size of the adjacent layer which is in the direction of the first layer and greater than the average pore size of the layer which is in the direction of the electrode assigned this side.

7. The separator of claim 1, wherein the porous ceramic material comprises an oxide of zirconium, silicon aluminum, or a combination thereof.

8. The separator of claim 1, wherein the ceramic material is producible by solidifying a slip which comprises particles having a large average particle size which determine the pore structure of the ceramic material and also comprises particles having a smaller average primary particle size which adhere the large particles together in the course of the solidification of the slip.

9. The separator of claim 8, wherein the surface of the particles which form the layers additionally comprise SiO$_2$, Al$_2$O$_3$, ZrO$_2$ or SiC.

10. The separator of claim 1, wherein the layers comprise Li$_2$CO$_3$, Li$_3$N, LiAlO$_3$, or Li$_x$Al$_y$Ti$_z$(PO$_4$)$_3$ where $1 \leq x \leq 2$, $0 \leq y \leq 1$ and $1 \leq z2$.

11. The separator of claim 1, comprising an electrolyte for ion conductance.

12. The separator of claim 1 having a porosity of 15 to 80%.

13. The separator of claim 1, wherein the perforate support comprises polymeric fibers.

14. The separator of claim 1, wherein the support comprises fibers, filaments, yarn, or a combination thereof; and wherein the fibers and the filaments have a diameter from 1 to 150 μm and/or the yarn has a diameter from 3 to 150 μm.

15. The separator of claim 1, wherein the support is nonwoven and has a pore size from 5 to 500 μm.

16. The separator of claim 1 that is stable under service conditions at not less than 100° C.

17. The separator of claim 1 wherein the thickness of the separator ranges from 10 to 1000 μm.

18. The separator of claim 1, wherein the separator tolerates a bending radius down to 100 mm.

19. An electrochemical cell comprising the separator of claim 1 which comprises a first layer having an average pore size from 50 to 1000 nm and at least one further layer having an average pore size from 5 to 400 nm.

20. A method of producing an electrochemical cell comprising incorporating the separator of claim 1 into the electrochemical cell.

* * * * *